United States Patent [19]

Philipps

[11] 3,791,406

[45] Feb. 12, 1974

[54] CHARGING HOSE ASSEMBLY

[75] Inventor: Virgil J. Philipps, Chicago, Ill.

[73] Assignee: Everco Industries Inc., Chicago, Ill.

[22] Filed: Sept. 8, 1972

[21] Appl. No.: 287,289

[52] U.S. Cl......... 137/515.5, 137/539, 137/543.17, 285/239
[51] Int. Cl............................................ F16k 15/04
[58] Field of Search. 251/148, 150, 152; 137/515.5, 137/539, 539.5, 541, 543.13, 543.17, 543.19; 62/292; 285/174, 239

[56] References Cited
UNITED STATES PATENTS

| 864,618 | 8/1907 | DeLoche | 285/174 |
| 2,918,083 | 12/1959 | Clark, Jr. et al. | 137/515.5 |
| 2,805,088 | 9/1957 | Cline | 285/239 |
| 3,058,486 | 10/1962 | McDermott et al. | 137/515.5 |
| 1,764,186 | 6/1930 | Teesdale | 137/515.5 |
| 2,674,262 | 4/1954 | Bradshaw | 251/148 X |
| 3,210,100 | 10/1965 | Lowles et al. | 285/239 |
| 3,335,750 | 8/1967 | Kepnel | 137/515.5 |

FOREIGN PATENTS OR APPLICATIONS

| 813,183 | 5/1959 | Great Britain | 137/515.5 |

Primary Examiner—William R. Cline
Attorney, Agent, or Firm—Edward C. Threedy

[57] ABSTRACT

A charging hose assembly including a ball check valve mechanism disposed within the passageway of an end connector for the hose assembly to prevent pressurized reverse flow of material therethrough.

3 Claims, 6 Drawing Figures

PATENTED FEB 12 1974 3,791,406

CHARGING HOSE ASSEMBLY

SUMMARY OF THE INVENTION

A charging hose assembly utilized in a charging operation wherein a flow of fluid or gas is forced under pressure in one direction through the hose assembly, with a check valve disposed within one connector end of the assembly, which functions to prevent reverse pressurized flow through the hose.

The check valve is of the spring-biased ball type and, to be effective and operative, the spring and ball must be retained in a protected position within the connector end of the hose assembly; therefore, there is provided an arrangement of parts consisting of a novel spring depressor, a ball check, and retaining bushing, all cooperating to achieve the proper placement of such parts within the cutter end of the hose assembly.

GENERAL DESCRIPTION

The invention will be best understood by reference to the accompanying drawings showing the preferred form of embodiment of the invention, and in which.

In many instances it becomes necessary to utilize a specific hose assembly in a charging operation, for example, but not limited to, refilling of cooling gases in a refrigeration system wherein it is desirable to provide as a safety measure in the hose assembly a ball check valve which will prevent pressurized reverse flow of the material through the hose assembly.

Figure 1:
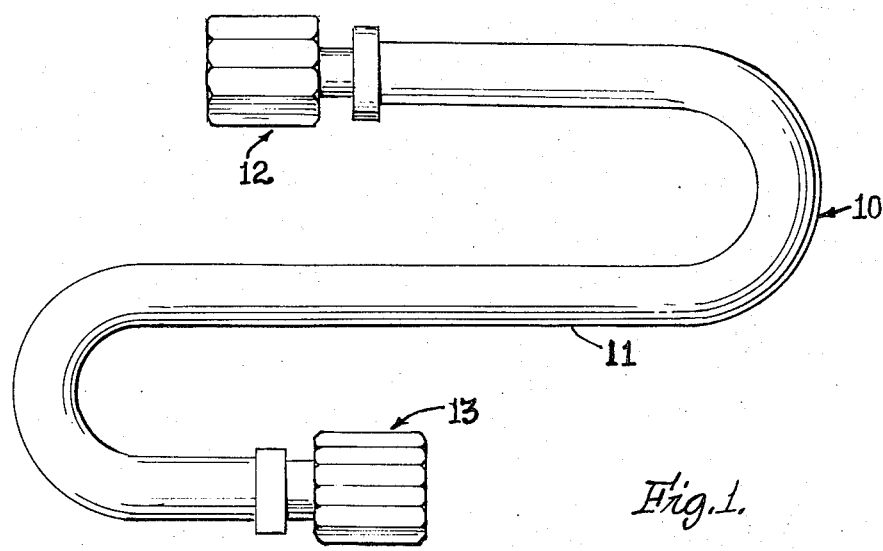
FIG. 1 is a perspective view of the charging hose assembly.
Figure 2:
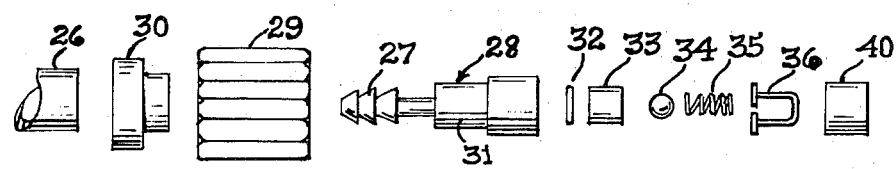
FIG. 2 is an exploded view of the parts of the ball check valve included in one end of the charging hose assembly.

FIG. 1 shows the preferred hose assembly 10 including a suitable length of hollow hose 11 having at one end a connector 12 adapted to be connected to a source of supply of either fluid or gas to be transmitted through the hose 11, and at the exhaust end a second connector 13 which includes a check valve hereinafter described.

Figure 3:
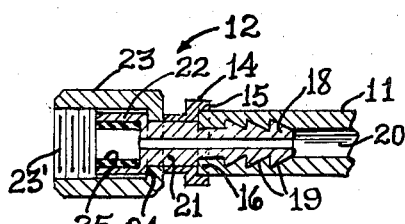
FIG. 3 is a fragmentary detail sectional view of one end of the hose assembly.

The connector 12, as shown in FIG. 3, comprises a cap 14 which provides an annular flange 15 which receives the end 16 of the hose 11. Projected through the cap 14 and into the end of the hose 11, is a hollow spud 18 provided with a plurality of annular stepped teeth 19 which forcibly engage the yieldable wall surfaces of the hose 11 defining the bore 20. The spud 18 provides an enlarged body portion 21 which is disposed within the cap 14 as well as an outer enlarged head portion 22 which, when projected into the connector nut 23, rests upon an internal shoulder 24 such that the parts thereof are assembled together in the manner shown in FIG. 3.

The connector nut 23 is provided with an internally threaded bore 23' for connection to a supply source as required. A suitable washer 25 may be conveniently disposed within the outer enlarged portion 22 of the spud 18, as shown.

Figure 4:
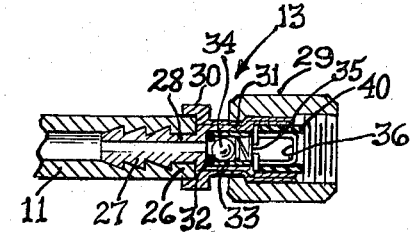
FIG. 4 is a fragmentary detail sectional view of the ball check valve in an end connector assembly.

The exhaust end of the charging hose assembly 10 includes a number of like components, as just described, as well as a spring-biased ball check valve. As shown in FIG. 4, the end 26 of the hose has inserted therein the grooved extension portion 27 of the spud 28 which has been projected into a connector nut 29 as well as an end hose cap 30, all in the manner heretofore described.

In the assembly shown in FIG. 4, the spud 28, however, has its medial circular body portion 31 counterbored to provide an area for the reception of the spring-biased ball check.

Within the counterbore of the body portion 31 of the spud 28 is positioned an O ring 32 for effectively sealing the same in a well-known manner. Upon the O ring 32 sits a retainer bushing 33. The diameter of the retainer bushing 33 is such that it has a press-fit within the counterbore of the portion 31 of the spud 28. Within the retainer bushing 33 is a ball 34 as well as a coil spring 35. To maintain the spring 35 and ball 34 in a depressed position upon the O ring 32 for effective sealing thereof, there is provided a depressor 36.

Figure 5:
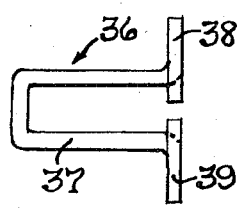
FIG. 5 is an elevational view of the spring retainer as utilized in the invention.
Figure 6:
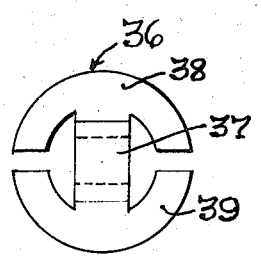
FIG. 6 is an end view of the spring retainer of the invention.

As shown in FIGS. 5 and 6, this depressor 36 comprises a U-shaped body 37, the ends of the arms thereof terminating into complementary flat base members 38 and 39, semicircular in configuration and separated through a centerline extending parallel to the arms of the U-shaped body member 37. The base members 38 and 39 provide a substantially flat surface which extends perpendicularly to the arms of the U-shaped body 37. The depressor 36 is positioned within the connector nut 29 with its base members 38 and 39 abutting one end of the coil spring 35. A suitable seal 40 surrounds the arms of the U-shaped body 37 and is positioned against the base members 38 and 39 of the depressor 36 and retains the same in its position within the connector 29.

From the foregoing arrangement, it is obvious that there is provided a charging hose assembly wherein material under pressure is permitted to enter through one end of the hose assembly and exhausted through the opposite end of the hose assembly without material obstruction by the ball valve positioned therein. The exhaust material passing under pressure through the charging hose assembly 10, will unseat the ball 34 from the O ring 32 and be moved against the retainer spring 35 to permit the passage of the material therethrough.

In the event that unwarranted pressure is created at the exhaust end of the charging hose assembly 10, the ball check 34 will prevent any dangerous reverse flow of the pressurized material through the hose assembly.

By utilizing the specifically constructed depressor 36, there is provided a means for maintaining the spring-biased ball check in an operative position without creating an obstruction to the passage of material through the hose assembly and whereby the ball check 34 and its cooperative coil spring 35 are maintained in proper alliance and cooperating relationship.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A charging hose assembly including a length of hose having a receiving connector at one end adapted for attachment to a pressurized supply source and a dispensing connector at the other end of the hose for attachment to a receiving unit, each connector having a center bore adapted to be in communication with the bore of the hose, comprising
   a. means provided on one end of each of said connectors consisting of elongated studs having a plurality of annularly extending stepped teeth for frictional insertion into the bore of the hose for attachment thereto,
   b. a medial chamber formed in the dispensing connector providing a valve seat at its juncture with the center bore of the dispensing connector,
   c. a check valve within said medial chamber and adapted to sit upon said valve seat,
   d. a resilient means within said medial chamber normally urging said check valve upon said valve seat,
   e. a second chamber within said dispensing connector of a diameter greater than said medial chamber and having open communication with the opposite end thereof, and
   f. a check valve and resilient means depressor carried within said second chamber and having a generally U-shaped body, the arms of which extend coaxially within said second chamber, the ends of said arms providing spaced apart substantially flat transversely extending semicircular base portions having a diameter greater than said U-shaped body and less than the diameter of said second chamber, with said base portion adapted to engage said resilient means positioned within said medial chamber so as to maintain the same and said check valve in operative position.

2. A charging hose assembly as defined by claim 1 wherein said semicircular base portions of said depressor are so formed that their ends are in spaced relation with respect to each other through the longitudinal center line of the U-shaped body, so as to provide open passageways for the free flow of material therethrough.

3. A charging hose assembly as defined by claim 1 and including a seal pressfitted into said second chamber so as to surround said U-shaped body of said depressor and in contact with said semicircular base portions thereof for maintaining said depressor within the dispensing connector.

* * * * *